United States Patent [19] [11] 3,989,869
Neumaier et al. [45] Nov. 2, 1976

[54] PROCESS FOR MAKING A POLYURETHANE FOAM SHEET AND COMPOSITES INCLUDING THE SHEET

[75] Inventors: Hermann Neumaier, Leichlingen; Klaus Noll, Cologne, both of Germany; Helmut Reiff, New Martinsville, W. Va.

[73] Assignee: Bayer Aktiengesellschaft, Leverkusen, Germany

[22] Filed: Aug. 22, 1974

[21] Appl. No.: 499,754

[30] Foreign Application Priority Data
Aug. 28, 1973 Germany............................ 2343294

[52] U.S. Cl. ......................... 428/254; 260/29.2 TN; 427/244; 427/407 C; 428/246; 428/261; 428/262; 428/286; 428/290; 428/310; 428/315; 428/424; 428/425
[51] Int. Cl.² ........................................... B32B 3/26
[58] Field of Search.................. 161/159, 160, 190; 156/78, 77; 260/29.2 TN; 427/244, 407; 428/310, 315, 424, 425, 246, 254, 261, 262, 286, 290

[56] References Cited
UNITED STATES PATENTS

| | | | |
|---|---|---|---|
| 3,537,947 | 11/1970 | Brazdzionis | 161/159 |
| 3,741,854 | 6/1973 | De Goria | 161/159 |
| 3,772,224 | 11/1973 | Marlin et al. | 161/159 |

Primary Examiner—William J. Van Balen
Attorney, Agent, or Firm—Frederick H. Colen; Lawrence S. Pope; Gene Harsh

[57] ABSTRACT

A process is provided for making a polyurethane mechanical foam adapted to be used as an interlayer between a plastic surface layer and a textile, the process involving frothing a non-ionic aqueous dispersion free from emulsifying agents of a polyurethane having a particle size of less than 1 micron, said dispersion containing more than 45% by weight polyurethane and a thickening agent whereby its viscosity of the dispersion is from about 10 to about 70 seconds with a Ford Cup having a 4 mm orifice to form a foamable mixture, spreading the frothed dispersion into a foamed film, and drying the resulting product.

27 Claims, No Drawings

PROCESS FOR MAKING A POLYURETHANE FOAM SHEET AND COMPOSITES INCLUDING THE SHEET

This invention relates to the production of polyurethane foam sheetings by frothing non-ionic polyurethane dispersions and to composite materials produced from such mechanical foams and textile substrates or microporous or homogeneous plastics sheet.

It is known to coat textile materials with polymer plastics. The purpose of such coating is to obtain a synergistic effect in the composite material with regard to its hard wearing qualities by combination of the properties of the textile base and its coating.

In principle, the polymers can be applied homogeneously to the substrate without an interlayer but it has been found advisable to separate the plastics surface layer from the substrate by an interlayer. The object of this interlayer is to act as a buffer between the abrasion-resistant top layer and the base which serves as reinforcement so that the composite material as a whole will have a softer handle and the component layers will adhere more firmly to each other.

The buffer materials used in the past were napped fabrics or compact foam layers. The napped fabrics in most cases consist of short staple fibers which are teased out of the weft threads of the support fabric or out of the filling threads in the case of a knitted support fabric by the usual napping processes of the textile industry. The manufacture of such a napped fabric requires close technical control of the process and is not very economical because the process includes several stages. On the other hand, it is essential to provide a buffer layer in the composite material, especially for the purpose of bonding the plastics layer to the textile substrate and especially if composite materials with good textile properties are to be produced from inferior textiles. Numerous attempts have therefore been made to replace the napped fabric by a suitable buffer layer of polymer material.

On a large commercial scale, PVC foams have previously been used for this purpose. Composite materials of this kind are widely used in the manufacture of bags, suitcases and the like and in upholstery manufacture. A serious disadvantage of these materials, however, is that due to their plasticizer content they are not resistant to chemical cleaning agents and, moreover, migration of the plasticizer causes undesirable changes in the properties.

Polyurethanes are basically particularly suitable for coating textiles because in suitable formulations they are extremely resistant to chemical cleaning agents and to abrasion. Homogeneous and even microporous polyurethane coatings, e.g. in sheet form, have been known for some time and used on high-quality napped woven or knitted fabrics serving as the textile substrate. It is known to slice polyurethane foams into thin sheets and fix these to the substrates by a backing or laminating process. It is also known to coat such composite foam materials with other polymers either by direct coating or by reversal process. Although these processes have numerous advantages, they also have the disadvantage that they require a selection of various kinds of foam sheeting with high unit densities to be kept in stock. Another disadvantage of the use of foam laminates from cut sheets of polyurethane foams and textile bases is that when the laminate is coated with polyurethanes dissolved in organic solvents, the foam swells or is partly dissolved. With a view to overcoming these disadvantages, it has been proposed to produce the polyurethane foams directly in situ on the textile by the foaming process by means of a propellant but attempts to achieve this have hitherto failed because it was not possible to produce coatings with a uniform thickness.

For this reason, attempts have also been made to apply aqueous polyurethane dispersions in the form of so-called mechanical foam to textile substrates. Thus, in German Offenlegungsschrift No. 2,012,662 it has been proposed to convert polyurethane dispersions which have been produced with the aid of emulsifiers into finely porous layers of foam by adding porous fillers which contain air. It is obvious that this process is commercially unattractive because the introduction of air in this way can only be achieved with relatively heavy fillers which would eliminate one of the advantages of the foam, namely its low density combined with its high mechanical strength. Moreover, the polyurethane dispersions used in the Offenlegungsscrift mentioned above, which are produced in known manner in the presence of emulsifiers, are not sufficiently mechanically stable to be worked up into stable spread-coatable polyurethane foams by frothing the latex with stable spread-coatable polyurethane foams by frothing the latex with a frothing apparatus, i.e. by introducing air mechanically into the polyurethane dispersion.

In German Offenlegungsschrift No. 1,495,745, it has been proposed to convert polyurethane ionomer dispersions which are free from emulsifiers into polyurethane mechanical foams by a frothing or churning process. Ionomer dispersions of this kind which are free from emulsifiers can be obtained by known methods, e.g. those described in German Pat. No. 1,237,306; German Offenlegungsschrifts No. 1,495,745; 1,495,847 and 2,035,732. It has been found in practice, however, that difficulties arise when these dispersions are foamed by a frothing process, especially if a finely porous, stiff, spreadcoatable foam is to be obtained for producing thin sheets or interlayers which can be applied to the textile substrate or separating layer without collapsing when dried. Although a porous foam is obtained when ionomer polyurethane dispersions produced by the methods referred to above are foamed by stirring air into them mechanically this foam is not three-dimensionally stable but collapses to a liquid mass, e.g. under the coating knife, and, when this liquid mass is dried, only a thin, cracked sheet with a network-like structure remains. Although a frothed foam produced from the above mentioned ionomer polyurethane dispersions can be applied as a laminating coating to a substrate in the same way as an ionomer polyurethane dispersion which has not been churned, all that is obtained after drying is a thin polyurethane sheet with a so-called crow's-foot structure and not a finely porous, compact polyurethane foam sheet of the kind which would be necessary to obtain the improvement in the handle and the bonding between the layers of the composite materials described at the beginning of this text.

According to an earlier proposal of the Applicants (U.S. Pat. Application No. 373,354 filed June 25, 1973 entitled "Composite Materials and process for Their Production") self-supporting foam sheets or foams which can be used for textile coating can be produced from ionomeric polyurethane dispersions which are free from emulsifiers. The dispersions used for this purpose must be finely divided (particle size less than 1.0 μ), highly fluid (viscosity approximately 2 – 12 Poises) and highly concentrated (solids content above 45%) and they must contain foaming agents, stabilizers and cross-linking agents. One disadvantage of foam foils produced by this process is their low tensile strength and, in addition, the many additives required reduce the water resistance of the foam.

It is therefore an object of this invention to provide a process for making polyurethane foams for use as an interlayer for composite materials which is devoid of the foregoing disadvantages. Another object of the invention is to provide a composite material having an improved polyurethane foam buffer layer between a polymer layer and a textile layer. A more specific object of the invention is to provide a method for making self-supporting, finely porous, smooth foam sheets having high-tensile stengths and good water resistance by the frothing process.

The foregoing objects and others are accomplished in accordance with this invention, generally speaking, by providing a process for making polyurethane foams suitable for buffer layers between a polymer layer and a textile layer of a composite material wherein from about 0.1 to about 10% by weight of a thickening agent is included in an aqueous, non-ionic polyurethane dispersion free from emulsifiers and having a polyurethane solids content of more than 45% by weight, a viscosity of from about 2 to about 12 poises and a particle size of less than 1 μ.

It has now surprisingly been found that polyurethane foams which are eminently suitable for use as buffer layers for the composite materials described above can very well be produced by a mechanical frothing process, even from aqueous, non-ionic polyurethane dispersions which are free from emulsifiers and which contain as their only additive merely about 0.1 to about 10% by weight, preferably about 0.6 to about 5.0% by weight (based on the polyurethane solid) of thickener if the dispersions have certain macroscopic properties, namely the following:

1. The dispersion must have a solids content of more than about 45% by weight of polyurethane. The solids content is preferably from about 48% to about 55% by weight.

2. The dispersion should have a viscosity of about 10 to about 70 seconds, preferably about 20 to about 50 seconds outflow time from a Ford cup with a 4 mm nozzle, i.e. about 2 to about 12 Poises, determined with a HAAKE viscotester VT 180 at stage 4.

3. The dispersion must be so finely divided that it shows the TYNDALL effect by reflected and transmitted light. This means that the diameter of the particles must be less than about 1.0 μ, preferably between about 0.07 and about 0.3 μ, determined by the method of measuring the variation of the angle with the slope of the light scatter curve.

It has also been found that layers which after drying in a drying channel give rise to self-supporting, finely porous, smooth foam sheets which have very high tensile strengths and which have excellent resistance wo water owing to the absence of foaming agents and stabilizers can be obtained from the churned polyurethane foams by the ordinary methods of brush or spread coating.

These self-supporting foam sheets can be produced with very small thicknesses (up to about 0.3 mm). These very thin sheets nevertheless have considerable mechanical strength and can therefore be rolled up safely and transported with suitable care. The foams are particularly easy to handle and transport if they are painted on self-supporting sheets. It is well known from the coating industry that polyurethane films from a weight per square meter of about 40 g upwards can be used for coatings which have such high abrasion resistance that they can be compared favorably with coatings of other high-molecular weight polymers which have more than three times their weight per square meter. There has always been a desire to produce self-supporting sheets with such a low weight per square meter in a transportable form. This wish has in the past been left unfulfilled because such thin films were difficult to handle without a reinforcing layer. There have been several attempts to stabilize the films by backing them on to supporting fabrics or supporting layers of non-woven substrates. This method, however, inevitably affected the properties of the films, in most cases disadvantageously. It has now been found, however, that the combination of sheet made of frothed polyurethane latex and film surprisingly results in a material which is distictly easy to handle without the advantageous properties of the foam or of the film being in any way deleteriously affected.

This invention therefore provides a self-supporting polyurethane foam sheet which has been produced by frothing a nonionic, aqueous polyurethane dispersion of the kind mentioned above which is free from emulsifiers, which dispersion in addition contains about 0.1 to about 10% by weight, preferably about 0.6 to about 5.0% by weight, of thickener, based on the polyurethane solids content.

This invention provides a composite material having at least the following layers:
  a. a plastics sheet, preferably a homogeneous or microporous polyurethane sheet or a PVC sheet; and
  b. a nonionic polyurethane dispersion foam having a density of about 0.04 to about 0.40 g/cm³ (determined according to DIN 53 420) obtained by a churning process.

This invention also provides a composite material having at least the following layers:
  a. a plastics sheet, preferably a homogeneous or microporous polyurethane sheet or a PVC sheet;
  b. a nonionic polyurethane dispersion foam having a density of about 0.04 to about 0.40 g/cm³ (determined according to DIN 53 420) obtained by the churning process; and
  c. a woven or knitted textile layer or fleece manufactured from a fibrous material.

The invention also provides a composite material having at least the following layers:
  a. a nonionic polyurethane dispersion foam having a density of about 0.04 to about 0.40 g/cm³ obtained by the churning process; and
  b. a woven or knitted textile layer or fleece manufactured from a fibrous material.

The necessity for fineness of subdivision, low viscosity and high solids content in the nonionic polyurethane dispersions used according to the invention arises from the following factors:

The introduction of air into the polyurethane dispersion produces, effectively, a phase of air-containing cells in a continuous phase comprising the cell membrane formed by the dispersion. If the viscosity of the polyurethane dispersion is too high, the air cannot be stirred in sufficiently homogeneously, with the result that a foam with an irregular structure is obtained. In addition, high viscosity renders the transport of the dispersion through the churning apparatus more difficult. Moreover, if the dispersed polyurethane particles are not sufficiently finely divided, their film-forming capacity is limited so that on drying, i.e. on removal of water from the cell membrane, the particles can no longer coalesce sufficiently and consequently the cell membrane breaks. Instead of a smooth foam, a foam with a cracked surface is obtained. The same effect results if the solids content of the nonionic polyurethane dispersion is too low because the continuous introduction of air into a given quantity of polyurethane dispersion depletes the cell membrane of substance since the same quantity of polyurethane must then envelop an increasing number of pores or pores with an increasing diameter. At a given point, this progressive depletion of substance will result in the cell membrane tearing. One must therefore restrict the quantity of air stirred into the mixture, in which case the foam obtained will differ only slightly from a homogeneous sheet, or otherwise a foam with a cracked surface will be obtained.

The preparation of the nonionic, emulsifier-free polyurethane dispersions suitable for the process according to the invention may be carried out, for example, by the method according to Canadian Pat. No. 919,329:

1 mol of a trifunctional polyether polyol is reacted with 3 mols of a diisocyanate. The resulting adduct, which contains isocyanate groups, is reacted in such a manner with a mixture of a. a monohydric, low-molecular weight alcohol and
b. a reaction product of a monohydric alcohol or a monocarboxylic acid and ethylene oxide (molecular weight approximately 600) that a prepolymer which contains 1 mol of monofunctional polyethylene oxide adduct to approximately 3000 molecular weight units is obtained. This prepolymer is emulsified in water with the aid of mechanical dispersing devices without an emulsifying agent to produce a latex which is polymerized by reaction with water or some other chain-lengthening agent known from polyurethane chemistry to produce the final polymer. When preparing the latices, so little water is used that the solids content will be above about 45% by weight and preferably above 50% by weight.

Self-dispersible, nonionic polyurethane dispersions which can be used for the process according to the invention may also be prepared according to an earlier proposal of the present applicants (U.S. Pat. Application No. 452,180 filed Mar. 18, 1974 entitled "Nonionic Polyurethane Dispersions") by introducing side chain polyethylene oxide units attached to allophanate or biuret groups into linear polyurethanes.

The production of these polyurethanes which can be dispersed in water without the aid of dispersing agents is carried out according to known methods of polyurethane chemistry by reacting organic compounds which have a molecular weight of about 500 to about 6000, preferably about 600 to about 3000, which contain end groups capable of reacting with isocyanate groups and which are difunctional for the purpose of the isocyanate polyaddition reaction, with organic diisocyanates, and, optionally, difunctional chain-lenghtening agents with a molecular weight below 500 which are known per se in the chemistry of polyurethanes. It is essential in this reaction to use or include organic diisocyanates of the general formula

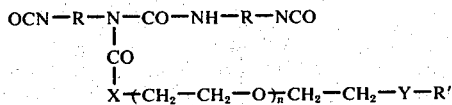

in which
R denotes an organic group of the kind which can be obtained by removing the isocyanate groups from an organic diisocyanate which has a molecular weight in the range of about 112 to about 1000,
R' denotes a monovalent hydrocarbon group containing 1 to 12 carbon atoms,
X and Y are the same or different and represent oxygen or a group of the formula -N(R")- in which R" represents a monovalent hydrocarbon group containing 1 – 12 carbon atoms, and
n denotes an integer of from 9 to 89.

These special diisocyanates are preferably used as mixtures with conventional unmodified organic diisocyanates of the general formula $R(NCO)_2$ wherein R is a divalent organic radical. The diisocyanate mixtures used should contain 5 to 100 mol percent, preferably 10 to 50 mol percent of modified diisocyanates.

The following are specific examples of suitable difunctional organic compounds with a molecular weight of about 500 to about 6000, preferably about 600 to about 3000, which contain end groups capable of reacting with isocyanates:

1. The dihydroxy polyesters known per se in polyurethane chemistry which are obtained from dicarboxylic acids such as succinic acid, adipic acid, suberic acid, azelaic acid, sebacic acid, phthalic acid, isophthalic acid, terephthalic acid, tetrahydrophthalic acid, etc. and diols such as ethylene glycol, propylene-1,2-glycol, propylene-1,3-glycol, diethylene glycol, butane-1,4-diol, hexane-1,6-diol, octane-1,8-diol, neopentyl glycol, 2-methyl propane-1,3-diol or the various isomeric bishydroxymethyl cyclohexanes;

2. The polylactones known per se in polyurethane chemistry, e.g. polymers of ε-caprolactone which have been started on the dihydric alcohols mentioned above;

3. polycarbonates known per se in polyurethane chemistry of the kind which can be obtained, for example, by reacting the above mentioned diols with diaryl carbonates or phosgene;

4. the polyethers known per se in polyurethane chemistry such as, for example, the polymers or copolymers of styrene oxide, propylene oxide, tetrahydrofuran, butylene oxide or epichlorohydrin which can be obtained using divalent starter molecules such as water, the above mentioned diols or amines which contain 2—N—H— bonds;

5. the polythioethers, polythio mixed ethers and polythioether esters known in polyurethane chemistry;

6. the polyacetals known in polyurethane chemistry, for example those obtained from the above mentioned diols and formaldehyde; and 7. difunctional polyether esters containing end groups which are capable of reacting with isocyanate groups.

Dihydroxy polyesters, dihydroxy polylactones and dihydroxy polycarbonates are preferably used.

The chain-lengthening agents with a molecular weight below about 500 may be, for example, the low-molecular weight diols described for the preparation of dihydroxy polyesters, or also diamines such as diaminoethane, 1,6-diaminohexane, piperazine, 2,5-dimethyl piperazine, 1-amino-3-aminomethyl-3,5,5-trimethylcyclohexane, 4,4'-diaminodicyclohexylmethane, 1,4-diaminocyclohexane, 1,2-propylene diamine or also hydrazine, aminoacid hydrazides, hydrazides of semicarbazidocarboxylic acids, bis-hydrazides and bis-semicarbazides.

Suitable diisocyanates of the general formula $R(NCO)_2$ include the known diisocyanates of polyurethane chemistry in which R represents a divalent aliphatic hydrocarbon group preferably containing 2 – 18 carbon atoms, a divalent cycloaliphatic hydrocarbon group containing preferably 4 – 15 carbon atoms, a divalent aromatic hydrocarbon group containing preferably 6 – 15 carbon atoms or an araliphatic hydrocarbon group containing 7 – 15 carbon atoms. The following are typical examples of such diisocyanates: ethylene diisocyanate, tetramethylene diisocyanate, hexamethylene diisocyanate, dodecamethylene diisocyanate, cyclohexane-1,3-and -1,4-diisocyanate, 1-isocyanato-3-isocyanatomethyl-3,5,5-trimethyl cyclohexane, 4,4'-diisocyanatodicyclohexylmethane or also aromatic diisocyanates such as 2,4-diisocyanatotoluene, 2,6-diisocyanatotoluene, mixtures of these isomers, 4,4'-diisocyanatodiphenyl methane, 1,5-diisocyanatonaphthalene, etc.

Examples of suitable organic compounds containing groups reactive with isocyanato groups and having a molecular weight of about 500 to about 6000, suitable chain lengthening agents and suitable organic diisocyanates of the formula $R(NCO)_2$ are disclosed by Saunders and Frisch in the book "Polyurethanes: Chemistry and Technology" published by Interscience Publishers.

The modified allophanate diisocyanates may be prepared, for example, by heating 1 mol of a monofunctional alcohol of the general formula

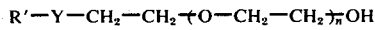

with two mols of one of the above mentioned diisocyanates of the general formula $R(NCO)_2$, the urethane being formed in a first step of the reaction and then reacting at an elevated temperature with a second mol of diisocyanate to form the allophanate diisocyanate. If desired, trimerization of the diisocyanates may be prevented by the addition of catalytic quantities of alkylating agents such as p-toluene sulphonic acid ester in the manner described in U.S. Pat. No. 3,769,318.

Furthermore, allophanatization may be accelerated by the method described in said patent by the addition of certain metal compounds, e.g. zinc acetyl acetonate.

To prepare biuret diisocyanates which may be used instead of the allophanate diisocyanates, the monohydric alcohol of the formula

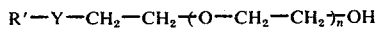

is first converted into a secondary amine of the general formula

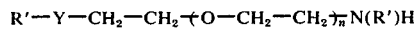

This conversion of the alcohols into the corresponding secondary amines may be carried out, for example, by the known reaction with N-substituted ethylene imines or by a condensation reaction of the alcohols with primary amines in a molar ratio of between 1 : 1 and 1 : 10. In cases where ethylene imine derivatives are used, the number $n$ is increased to $N + 1$. The conversion of the resulting secondary amines which contain polyethylene oxide units into the biuret diisocyanates which are used for preparing the self-dispersible dispersions is carried out by reacting one mol of the secondary amine with at least two mols of diisocyanate of the general formula $R(NCO)_2$. In this reaction, the urea isocyanate is first formed from the secondary amine and one mol of diisocyanate, and this then reacts with a second mol of diisocyanate at an elevated temperature to produce a biuret diisocyanate. In this reaction also, trimerization of the diisocyanate can be suppressed by catalytic quantities of alkylating agents such as p-toluene sulphonic acid esters.

The biuret diisocyanates in the same way as the allophanate diisocyanates are used as mixtures with unmodified diisocyanates of the formula $R(NCO)_2$ for preparing the self-dispersible polyurethanes, the diisocyanate mixtures used containing from 5 to 100 and preferably from 10 to 50 mols percent of modified diisocyanate. If desired, of course, mixtures of allophanate diisocyanates and biuret diisocyanates may be used.

Any suitable monohydric alcohol which contains polyethylene oxide units may be used for preparing the modified diisocyanates. The modified diisocyanates may be obtained in known manner by ethoxylating monohydric alcohols or monohydric phenols of the general formula R'-O-H or by ethoxylating secondary amines of the general formula

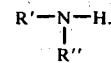

In the above formula,

R' and R'' represent the same of different hydrocarbon groups, in particular $C_1$–$C_{10}$ alkyl groups, $C_4$–$C_8$ cycloalkyl groups, $C_6$–$C_{12}$ aryl groups or $C_7$–$C_{10}$ aralkyl groups. The following are examples of suitable alcohols or phenols: methanol, ethanol, n-propanol, n-hexanol, n-decanol, isopropanol, tertiary butanol, phenol, p-cresol and benzyl alcohol. Suitable secondary amines are, for example, dimethylamine, diethylamine, dipropylamine, N-methyl-hexylamine, N-ethyl-decylamine, N-methyl-aniline, N-ethyl-benzylamine and N-methyl-cyclohexylamine.

The quantity of ethylene oxide to be added by grafting may vary within wide limits. the polyethylene oxide chain generally consists of 10 to 90 and preferably 20 to 70 ethylene oxide units.

The conversion of the polyethylene oxide alcohols into the corresponding secondary amines is carried out in known manner using N-substituted ethylene imines of the general formula

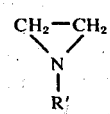

or primary amines of the general formula $R'$—$NH_2$ in which $R'$ has the meaning specified above.

The preparation of the polyurethanes which are dispersible in water is carried out according to known methods of polyurethane chemistry by reacting the higher molecular weight dihydroxyl compounds with the diisocyanates or diisocyanate mixtures, to which the chain-lengthening agents mentioned above may be added. The reaction may be carried out by a single-stage process or by a two-stage process (prepolymer process).

When preparing the self-dispersible polyurethanes, the reactants are used in proportions corresponding to a ratio of isocyanate groups to groups which are reactive with isocyanate groups of between 0.8 : 1 and 2.5 : 1, preferably between 1 : 1 and 1.1 : 1. These proportions do not include any water which may already be present during the preparation of the dispersible polyurethanes. If an excess of isocyanate is used then the reaction products naturally contain isocyanate groups which, when the products are dispersed in water, react with water to form polyurethane-polyureas which are free from isocyanate groups. The quantity of modified diisocyanates used or the quantity of polyethylene oxide units in these diisocyanates is chosen so that the finished polyurethane contains 3 to 30 percent by weight, preferably 5 to 20 percent by weight of polyethylene oxide segments in side chains.

Both the single-stage and the two-stage process may be carried out with or without solvents. Suitable solvents are water-miscible solvents which are inert towards isocyanate groups and have a boiling point below 100° C, e.g. acetone or methyl ethyl ketone.

Conversion of the dissolved polyurethane elastomers into an aqueous dispersion is preferably carried out by the addition of water to the stirred solution. In many cases, the phase will pass through a water-in-oil emulsion which changes into an oil-in-water emulsion after passing through a viscosity maximum. After removal of the solvent by distillation, a pure, aqueous stable dispersion is left behind.

The polyurethane elastomers prepared as described above may also be converted into dispersions by other methods, for example methods of dispersion without using solvents, e.g. by mixing the elastomer melts with water in an apparatus which is capable of producing high shearing gradients or the use of very small quantities of solvents to plasticize the reaction mixture, using the same apparatus, or methods employing non-mechanical dispersing means such as sound waves of extremely high frequency.

Self-dispersible, nonionic polyurethane dispersions can also be obtained by introducing polyethylene oxide side chains with the diol component. In addition to the above mentioned higher molecular weight diols, diisocyanates of the formula $R(NCO)_2$ and, optionally, chain-lengthening agents, diols of the following general formula

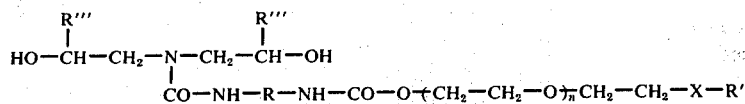

are then also used, in which formula

R denotes a divalent group of the kind obtained by removing the isocyanate groups from a diisocyanate having a molecular weight of about 112 to about 1000, X denotes oxygen or —NR''—, R' and R'' which may be the same or different, denote monovalent hydrocarbon groups containing from 1 to 12 carbon atoms, R''' denotes hydrogen or a monovalent hydrocarbon group containing from 1 to 8 carbon atoms, and n denotes an integer of from 4 to 89.

These compounds will be referred to hereinafter as hydrophilic chain-lengthening agents.

The hydrophilic chain-lengthening agents may be prepared, for example, by the following method:

Alcohols or monohydric phenols of the general formula R'—O—H (X = O) are first prepared in known manner as described above or the corresponding monovalent alcohols which contain polyethylene oxide units, as represented by the following formula

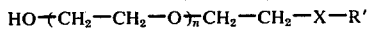

are prepared by ethoxylating secondary amines of the general formula

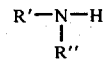

The quantity of ethylene oxide introduced by grafting may vary within wide limits. The polyethylene oxide chains here again generally comprise 5 to 90 and preferably 20 to 70 ethylene oxide units.

The reaction of the resulting monovalent alcohols which contain polyethylene oxide units with a large excess of one of the diisocyanates of the general formula $R(NCO)_2$ of which examples are given above, followed by the removal of the diisocyanate excess to produce the corresponding monoisocyanate which contains polyethylene oxide units as represented by the following general formula

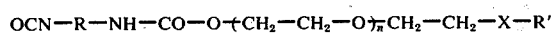

then takes place in a second reaction step.

In the second reaction step, the diisocyanate is preferably used in a 2 to 10 times molar excess, preferably a 3 to 4 times molar excess, in order to prevent the formation of corresponding bis-urethanes which are free from isocyanate groups. This second reaction step is preferably carried out by adding the monohydric alcohol which contains polyethylene oxide units to the diisocyanate in the reaction vessel. The reaction may be carried out at about 70° to about 130° C. The subsequent removal of the diisocyanate excess is preferably carried out by thin-layer vacuum distillation at about 100° to about 180° C.

The hydrophilic chain-lengthening agent is then obtained in a third reaction step by reacting the above described monoisocyanates which contain polyethylene oxide units with dialkanolamines of the general formula

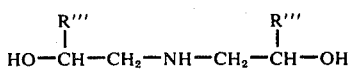

in which R''' has the meaning already indicated above. In this third reaction step, the reactants are preferably used in stoichiometric proportions. This third step of the reaction is preferably carried out at 0° to 50° C, preferably at 15° to 30° C. Suitable dialkanolamines of the above general formula are e.g. diethanolamine, dipropanolamine (R''' = CH$_3$) and bis-(2-hydroxy-2-phenyl-ethyl)-amine.

Preparation of the self-dispersible polyurethanes may be carried out also in this case by either a single-stage or a two-stage process (prepolymer process).

To prepare the self-dispersible polyurethanes, the reactants are used in an equivalent ratio of isocyanate groups to groups which are reactive with isocyanate groups of between 0.8 : 1 and 2.5 : 1, preferably between 0.95 : 1 and 1.5 : 1.

The hydrophilic chain-lengthening agents are used in quantities such that the finished polyurethane contains 3% to 30% by weight and preferably 5% to 20% by weight of side chain polyethylene oxide segments.

The dispersion of the polyurethanes is carried out in a similar manner to that described above.

The formulation of a spread-coatable paste which has been obtained from a nonionic polyurethane dispersion selected according to the features described above and which forms a good-quality finely porous foam which will not collapse or crack when dried may, for example, have the following composition:
a. Approximately 50% aqueous nonionic dispersion which is free from emulsifier and
b. 0.1 – 10% by weight, preferably 1.0 – 5.0% by weight of thickener, based on the polyurethane solids content.

All the customary thickening agents known per se may be used in the process according to the invention, e.g.: Sodium methyl celluloses, alkali metal salts of polyacrylic acids, alginates, polyvinyl alcohols or mixtures thereof, but preferably polyvinyl pyrrolidone. The thickeners are preferably used in aqueous solutions.

The spread-coatable, liquid foam obtained from such a paste by frothing is adjusted to a weight of about 400 to about 900 g per liter by introducing the correct amount of air. If so much air is stirred in that the weight per liter drops below 400 g/l then the foam becomes liable to crack because the pores are then too large and the pore membrane very depleted of substance. If, on the other hand, the weight is left above 900 g per liter, then the foam comes close in its properties to a homogeneous polyurethane sheet on account of the very low density of its pores. The weight per liter is preferably about 600 to about 700 g per liter.

As already described above, self-supporting, finely porous, smooth foam sheets which have considerable mechanical stability and can be rolled up can be obtained from these foams. The foam paste used for producing these sheets can be spreadcoated to layers of less than 1 mm in thickness. The layers are then dried at about 110° to about 160° C for 2–3 minutes, the loss of thickness of the layer by drying being on an average 25 – 30%. Very thin foam sheets with a thickness of less than 0.7 mm can also be produced. The gross density of the dried foam sheets determined according to DIN 53 420 is about 0.04 to 0.40 g/cm$^3$, preferably 0.15 g/cm$^3$.

The foam has an open-celled structure and the majority of cells measure 150 to 180 $\mu$.

It has already been described above that valuable, stable materials which have excellent handling properties and can be stored and transported without any special precautions can be obtained by a combination of such foam sheets with thin, self-supporting plastics sheets, preferably microporous or homogeneous polyurethane sheets or PVC sheets. The plastics sheets preferably have a weight per square meter of 30 to 70 g and a tensile strength of from 300 to 600 cp/cm$^2$.

It is possible, for example, to produce a thin polymer film, preferably a polyurethane film by the reversal process in known manner, either from organic solution or from aqueous dispersion, and then to dry it and subsequently coat it with an aqueous polyurethane foam according to the invention, again dry it, and then roll it up. This composite material may then be used as such without any loss in the mechanical properties of either of its two components.

According to one variation of this process, the aqueous compact foam is first painted on a release substrate and dried. The dissolved or dispersed polymer coating compound, preferably an organic polyurethane solution or aqueous polyurethane dispersion, is then painted on the dry foam sheet by a direct coating process and dried, and a composite material which is composed of homogeneous, abrasion-resistant polymer layer and open-celled foam layer and which has the same properties as above is again obtained.

According to another variation of this process, an already solidified microporous or homogeneous sheet, preferably a polyurethane sheet, conveyed e.g. on a conveyor belt, is coated with the aqueous compact foam and the foam is then dried on the already solidified microporous or homogeneous plastics sheet. A two-layered composite material which has good handling properties and is composed of an abrasion-resistant surface and a stabilizing layer of polyurethane compact foam is again obtained.

In all the variations of the process, the composite material may be separated from the release substrate immediately after leaving the drying channel and then rolled up or it may be left of the release substrate.

The composite two-layered material obtained in this way may subsequently be combined with all kinds of textile sheets by a laminating process to produce another composite material. This may be carried out, for example, by applying an aqueous or solvent-containing laminating binder either to the textile substrate or to the foam side of the two-layered composite material by the usual methods of the art and then uniting the textile material with the two-layered composite material.

When an aqueous laminating binder is used in the form of an aqueous polyurethane dispersion, the binder may also be applied in the form of a foam. This foam, however, is not a polyurethane compact foam according to the invention but an adhesive foam which collapses when spread on the surface and dried and which forms a cracked network of the kind normally obtained when churning conventional ionic polyurethane dispersions without the necessary additives described in German Offenlegungsschrift No. 2,231,411 (U.S. Ser. No. 373,354).

According to one variation of the process for producing the three-layered composite material consisting of abrasion-resistant surface, polyurethane compact foam and textile substrate, the compact foam is first painted on the textile substrate and dried. This novel two-layered composite material can also be handled and transported without trouble. An abrasion-resistant covering layer of an organic polymer solution or aqueous polymer dispersion, preferably an organic polyurethane solution or an aqueous polyurethane dispersion, may then be applied to the compact polyurethane layer at a later date to produce the three-layered composite material after drying.

According to another variation of the process for producing the three-layered composite material, the polyurethane compact foam painted on the other component is partly used as laminating binder before it is solidified by drying. In that case, the material which is to be added, which may be the textile substrate or the already solidified homogeneous or microporous plastics sheet, is carefully applied to the foam while the foam is still wet, and light pressure is applied. In these cases, the materials will, of course, not be passed through the laminating rollers under a high laminating pressure but the rollers will be adjusted to leave a gap between them.

The composite textile materials obtained by the processes mentioned above are distinguished by their full handle, elegant drape and suppleness, and the bond between the abrasion-resistant top layer of polymer and the textile is very firm even when inferior textiles without a napped surface are used. The surfaces of these composite materials may additionally be varied by the known methods employed in the textile and coating industry, that is to say a colorless or colored finish may be applied to the coating surface, for example a cloud pattern, or printed or embossed patterns of the kind commonly produced in the coating industry may be applied.

EXAMPLE 1

Preparation of the nonionic polyurethane dispersion which is free from emulsifier 3232 parts of a linear polyester diol from adipic acid, hexanediol and 2,2-dimethylpropane-1,3-diol having a hydroxyl number of approximately 66 were mixed with 258 parts of a compound from one mol of a polyethylene oxide ether with a hydroxyl number of 49 which had been started on n-butanol, one mol of hexane-1,6-diisocyanate and one mol of bis-($\beta$-hydroxyethyl)-amine. A mixture of 468 parts of 3-isocyanato-methyl-3,5,5-trimethyl-cyclohexyl isocyanate and 370 parts of hexane-1,6-diisocyanate was then added and the whole mixture was heated to a temperature of 100° C and heating was continued for 3 hours with stirring and exclusion of atmospheric moisture. The isocyanate content of the mixture dropped to 4.63% during this time. The reaction product was cooled to 60° C and diluted with 1200 parts of acetone.

A solution of 153 parts of 3-aminomethyl-3,5,5-trimethylcyclohexylamine and 45 parts of hydrazine monohydrate in 500 parts of water was rapidly added to the reaction solution and homogeneously mixed by stirring. 4050 parts of water were then rapidly added with vigorous stirring to the clear solution which contained 36% of solids, a milky-white, acetone-containing dispersion of the solids in water being formed, which appeared brownish when thin layers of it were viewed through transmitted light. After removal of the acetone by distillation under a pressure of 100 Torr, a pure, aqueous dispersion of the polyurethane urea particles with a solids content of 50% was left behind.

The solid particles of the dispersion contained 4.8% by weight of polyethylene oxide ether units.

2 parts by weight of a 30% aqueous polyvinyl pyrrolidone solution were added to 1000 parts by weight of this dispersion and the mixture was introduced into a continuously operating churning machine of the kind manufactured e.g. by EUR-O-MATIC (Holland) and OAKS (Great Britain). Sufficient air was stirred into the paste to produce a foam with a density of about 600. g per liter. The foam was open-celled and had an average pore size of 150 to 180 $\mu$.

The foam was spread in a thickness of 0.2 to 0.3 mm on a release support and dried for 3 minutes at 80° C and then for 2 minutes at 120° C. After cooling to room temperature, a foam layer which could easily be removed from the release support and then rolled up was obtained. The foam sheet had a tensile strength of at least 24 kp/cm².

EXAMPLE 2

The foam paste obtained in Example 1 was spread on a textile substrate (e.g. a woven or knitted cotton fabric) in a thickness of 0.9 mm and then dried at 80° C for 3 minutes and 120° C for 2 minutes. After cooling, the composite material e.g. of cotton fabric and foam sheet could be rolled up without sticking.

EXAMPLE 3

A polyvinyl chloride top coating was spread on a finegrained release support and dried. The frothed non-ionic polyurethane urea dispersion prepared as described in Example 1 was then spread over the polyvinyl chloride top coat in a thickness of 0.8 mm and dried for 3 minutes at 80° C followed by 2 minutes at 120° C.

The composite material was rolled up and later laminated to a substrate.

EXAMPLE 4

A linear polyurethane obtained from 100 parts of a polyester of butane-1,4-diol and adipic acid (hydroxyl number 56), 5 parts of butane-1,4-diol and 30 parts of 4,4'-diisocyanatodiphenylmethane was dissolved in a mixture of dimethylformamide and methylethyl ketone to produce a 30% solution. The solution was spread over a grained substrate (approximately 35 g of polyurethane/m²). when this layer had dried, a foam produced as described in Example 1 was spread over it in a thickness of 0.7 mm and then dried. After cooling, the composite material could be rolled up and later bonded to a knitted cotton fabric (surface weight 140 g/m²) by means of a layer of commercial polyurethane adhesive. After 2 minutes' drying at 140° C, a high-bulk grained material was obtained which was suitable for use in the outerwear garment industry.

EXAMPLE 5

A polyurethane from 200 parts of a copolyester from adipic acid, hexanediol and neopentyl glycol (molecular weight 1700), 60 parts of 1-isocyanato-3,3,5-trimethyl-5-isocyanatomethyl-cyclohexane and 25 parts of 1-amino-3,3,5-trimethyl-5-aminomethyl cyclohexane was dissolved in a mixture of toluene and isopropanol to produce a 30% solution. The solution was applied by the transfer process to a grained release paper weighing about 40 g/m². When the layer had been dried, the polyurethane dispersion foam obtained in Example 1 was applied and a polyester/cotton fabric (150–200 g/m²) was also applied with its smooth surface before the drying process. The composite material could then easily be removed from the release support after drying. A soft, high-bulk, leather-like material which was suitable for the manufacture of outer-wear garments, shoes and upholstery was obtained.

EXAMPLE 6

149 g of an allophanate diisocyanate were added at 70° C to 425 g of a hexanediol polycarbonate (dehydrated) with a molecular weight of 1940 and the mixture was heated to 100° C for 2 hours (isocyanate content = 3.61%), cooled to 65° C and dissolved in 574 g of acetone. A 50% solution of an isocyanate prepolymer in acetone (isocyanate content = 1.73% by weight) was obtained.

The allophanate diisocyanate was prepared as follows: 1500 g of a polyethylene oxide monoalcohol with a molecular weight of 2030 which had been started on n-butanol and 1305 g of tolylene diisocyanate (ratio of isomers 2.4 : 2.6 = 80 : 20) were heated to 100° C for 5 hours in the presence of 0.1% by weight of methyl p-toluene sulphonate and 0.005% by weight of zinc acetal acetonate. 2805 g of allophanate diisocyanate dissolved in tolylene diisocyanate were obtained after the addition of 0.025% by weight of benzoyl chloride. The isocyanate content was 20% by weight, the polyethylene oxide content approximately 53% by weight.

36.5 g of 3-aminomethyl-3,5,5-trimethyl-cyclohexylamine in 200 g of acetone were added to 514 g of the prepolymer solution at room temperature with stirring and 300 g of water were then added with vigorous stirring after 30 seconds. a bluish translucent polyurethane dispersion which contained acetone was obtained. After removal of the solvent by distillation at about 150 Torr, 570 g of a finely divided, nonionic polyurethane dispersion which had a solids content of 48% were obtained.

The latex produced in this way was applied as a mechanically churned dispersion foam to a polyurethane top coating as described in Example 5 and before it was dry the smooth side of a polyester/cotton fabric (150–200 g/m²) was applied to it. The composite material could easily be stripped off after drying. A soft, leather-like material which was very suitable for the manufacture of outerwear garments and luggage was obtained.

EXAMPLE 7

898 g of a polyoxypropylenetriol with an equivalent weight of 896 which had been started on glycerol were dehydrated in a vacuum at about 100° C for half an hour. After cooling to room temperature, 174 g of tolylene diisocyanate were added and the mixture was heated to 88° C and stirred for 4 hours. A mixture of 13.55 g of 1-butanol and 160 g of an ethylene oxide adduct of oleic acid was added to the resulting prepolymer at the same temperature and reacted for 1 hour. The average theoretical molecular weight of the prepolymer with the exclusion of polyoxyethylene glycol monooleate masking additive was 3300.

555 g of deionized water were introduced into a separate container equipped with high-speed mixer, and 311 g of the prepolymer described above were introduced with stirring. A stable, nonionic latex was formed.

The latex produced in this way was applied as a mechanically frothed dispersion foam to a polyurethane top coating as described in Example 5 and, before it was dry, a polyester/cotton fabric (150 – 200 g/m²) was laminated to it with the smooth side of the fabric facing the latex. After drying, the composite material could easily be stripped from the release support. A soft, high-bulk, leather-like material which was very suitable for the manufacture of outerwear garment and luggage goods was obtained.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:
1. A composite material comprising the following adjacent layers:
   a. a plastics sheet, and
   b. a sheet of mechanical foam having a density of about 0.04 to about 0.40 g/cm³ obtained by mechanically frothing a nonionogenic aqueous polyurethane dispersion having
      i. a solids content of more than about 45% by weight of polyurethane,
      ii. a viscosity of about 10 to about 70 seconds outflow time from a Ford cup with 4 mm nozzle and
      iii. a particle diameter of less than 1.0µ.
2. A composite according to claim 1, characterized in that about 0.1 to about 10% by weight of thickener, based on the polyurethane solids, are added to the nonionic polyurethane dispersion.
3. A composite material comprising the following adjacent layers;
   a. a woven or knitted textile layer or nonwoven web of a fibrous material,
   b. a foam layer having a density of about 0.04 to about 0.40 g/cm³ obtained by mechanically frothing a nonionogenic aqueous polyurethane dispersion having
      i. a solids content of more than about 45% by weight of polyurethane,
      ii. a viscosity of about 10 to about 70 seconds outflow time from a Ford cup with 4 mm nozzle and
      iii. a particle diameter of less than 1.0µ, and
   c. a plastics sheet.
4. A composite material comprising the following adjacent layers:
   a. a foam layer having a density of about 0.04 to about 0.40 g/cm³ obtained by mechanically frothing a nonionic aqueous polyurethane dispersion having
      i. a solids content of more than about 45% by weight of polyurethane,
      ii. a viscosity of about 10 to about 70 seconds outflow time from a Ford cup with 4 mm nozzle and
      iii. a particle diameter of less than 1.0µ, and
   b. a fibrous textile layer.
5. A self-supporting polyurethane foam sheet having a density of about 0.04 to about 0.40 g/cm³ which has been produced by mechanically frothing a nonionic aqueous polyurethane dispersion having
   i. a solids content of more than about 45% by weight of polyurethane,
   ii. a viscosity of about 10 to about 70 seconds outflow time from a Ford cup with 4 mm nozzle and
   iii. a particle diameter of less than 1.0 µ.

6. In a process for producing a composite material from
   a. a homogeneous or microporous plastics sheet and
   b. a polyurethane foam, the improvement which comprises applying a homogeneous or microporous plastic sheet to a release support, spread-coating on the sheet a polyurethane foam having a density of about 0.04 to about 0.40 g/cm$^3$, which has been produced by mechanically frothing a nonionogenic aqueous polyurethane dispersion having
   i. a solids content of more than about 45% by weight polyurethane,
   ii. a viscosity of about 10 to about 70 seconds outflow time from a Ford cup with 4 mm nozzle and
   iii. a particle diameter of less than 1.0 $\mu$,
and drying the coating and thereafter removing the release support.

7. A process for producing a composite material from
   a. a homogeneous or microporous plastics sheet and
   b. a polyurethane foam, which comprises spread coating on a release support a polyurethane foam having a density of about 0.04 to about 0.40 g/cm$^3$ which has been produced by mechanically frothing a nonionogenic aqueous polyurethane dispersion having
   i. a solids content of more than about 45% by weight of polyurethane,
   ii. a viscosity of about 10 to about 70 seconds outflow time from a Ford cup with 4 mm nozzle and
   iii. a particle diameter of less than 1.0 $\mu$,
applying and lightly pressing a solid, self-supporting homogeneous or microporous plastics sheet to the still liquid foam, drying and removing the release support.

8. A process for producing a composite material from
   a. a homogeneous or microporous plastics sheet and
   b. a polyurethane foam,
which comprises spread coating on a release support a polyurethane foam having a density of about 0.04 to about 0.40 g/cm$^3$, which has been produced by mechanically frothing a nonionogenic aqueous polyurethane dispersion having
   i. a solids content of more than about 45% by weight of polyurethane,
   ii. a viscosity of about 10 to about 70 seconds outflow time from a Ford cup with 4 mm nozzle and
   iii. a particle diameter of less than 1.0 $\mu$,
drying the coating, applying a liquid plastics coating compound on the coating, solidifying the liquid plastics coating compound on the layer of foam to produce a homogeneous or microporous plastics sheet and removing the release support.

9. A process for producing a composite material from
   a. a plastics sheet,
   b. a polyurethane foam and
   c. a textile material
which comprises applying a homogeneous or microporous plastics sheet to a release support, spread coating on the sheet a polyurethane foam having a density of from about 0.04 to about 0.40 g/cm$^3$, which has been produced by mechanically frothing a nonionogenic aqueous polyurethane dispersion having
   i. a solids content of more than about 45% by weight of polyurethane,
   ii. a viscosity of about 10 to about 70 seconds outflow time from a Ford cup with 4 mm nozzle and
   iii. a particle diameter of less than 1.0 $\mu$,
applying a textile material to the foam while the foam is still liquid, drying and removing the release support.

10. The process for producing composite material according to claim 6, wherein the plastics sheet is a microporous or homogeneous polyurethane sheet.

11. The process for producing composite materials according to claim 6, wherein the plastics sheet is a polyvinyl chloride sheet.

12. A process for producing a composite material which comprises applying a layer of adhesive to a composite material according to claim 1, embedding a textile layer in the layer of adhesive by light pressure and drying.

13. A process for producing a composite material consisting of a polyurethane foam and a woven or knitted textile material or consisting of a polyurethane foam and a non-woven web, which comprises spread-coating a polyurethane foam having a density of from about 0.04 to about 0.40 g/cm$^3$ which has been produced by mechanically frothing a nonionogenic aqueous polyurethane dispersion having
   i. a solids content of more than about 45% by weight of polyurethane,
   ii. a viscosity of about 10 to about 70 seconds outflow time from a Ford cup with 4 mm nozzle and
   iii. a particle diameter of less than 1.0 $\mu$,
on a release support and then laminating the coating to the textile material or to the non-woven web, drying the laminate and removing the release support.

14. A process for producing a self-supporting polyurethane foam sheet which comprises preparing a spread-coatable polyurethane foam from a nonionic aqueous polyurethane dispersion having
   a. a solids content of more than 45% by weight of polyurethane,
   b. a viscosity of 10–70 seconds outflow time from a Ford cup with 4 mm nozzle,
   c. a particle diameter of less than 1.0$\mu$, and
   d. 0.1–10% by weight of thickener, based on the polyurethane solids content by the churning process, applying the foam to a release support, drying, and removing the release support.

15. The process of claim 6 wherein the plastic sheet is applied to the release support by coating the release support with a liquid plastic coating and drying the coating.

16. The process of claim 6 wherein the plastic sheet is preformed and then applied to the release support.

17. The process of claim 9 wherein the textile is a woven or knitted textile or a non-woven web.

18. The process of claim 12 wherein the textile is a woven or knitted textile or a non-woven web.

19. A process for making a polyurethane foam sheet adapted to be laminated with a textile which comprises mechanically frothing a nonionic aqueous dispersion free from emulsifying agents of a polyurethane having a particle size of less than 1 micron, said dispersion containing more than 45 % by weight polyurethane and a thickening agent whereby the viscosity of the dispersion is from about 10 to about 70 seconds with a Ford cup having a 4 mm orifice to form a foamable mixture stirring air into said mixture, spreading the frothed dispersion into a film and drying the resulting product.

20. The process of claim 19 wherein the thickening agent is polyvinyl pyrrolidone.

21. The process of claim 19 wherein the said film is spread over a release support.

22. The composite material of claim 1 wherein the plastics sheet is a substantially non-porous polyurethane sheet.

23. The composite material of claim 1 wherein the plastics sheet is microporous polyurethane sheet.

24. The composite material of claim 1 wherein the plastics sheet is a polyvinyl chloride sheet.

25. The composite material of claim 3 wherein the plastics sheet is a homogeneous polyurethane sheet.

26. The composite material of claim 3 wherein the plastics sheet is a microporous polyurethane sheet.

27. The composite material of claim 3 wherein the plastics sheet is a polyvinyl chloride plastic sheet.

* * * * *